United States Patent
Ge et al.

(10) Patent No.: US 10,648,916 B2
(45) Date of Patent: May 12, 2020

(54) NANO FINGERS WITH ASYMMETRIC MATERIAL COMPOSITION

(71) Applicant: HEWLETT-PACKARD DEVELOPMENT COMPANY, L.P., Houston, TX (US)

(72) Inventors: Ning Ge, Palo Alto, CA (US); Viktor Shkolnikov, Palo Alto, CA (US); Anita Rogacs, Palo Alto, CA (US); Steven J. Simske, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 97 days.

(21) Appl. No.: 16/076,344

(22) PCT Filed: Jan. 31, 2017

(86) PCT No.: PCT/US2017/015777
§ 371 (c)(1),
(2) Date: Aug. 8, 2018

(87) PCT Pub. No.: WO2018/143924
PCT Pub. Date: Aug. 9, 2018

(65) Prior Publication Data
US 2019/0049386 A1     Feb. 14, 2019

(51) Int. Cl.
*G01J 3/44*      (2006.01)
*G01N 21/65*     (2006.01)
*B82Y 15/00*     (2011.01)
*B82Y 20/00*     (2011.01)
*B82Y 30/00*     (2011.01)
*B82Y 40/00*     (2011.01)

(52) U.S. Cl.
CPC ............ *G01N 21/658* (2013.01); *B82Y 15/00* (2013.01); *B82Y 20/00* (2013.01); *B82Y 30/00* (2013.01); *B82Y 40/00* (2013.01)

(58) Field of Classification Search
CPC ...... G01N 21/658; B82Y 15/00; B82Y 20/00; B82Y 30/00; B82Y 40/00
See application file for complete search history.

(56) References Cited

U.S. PATENT DOCUMENTS 7,303,815 B2   12/2007  Yang et al.
7,342,656 B2   3/2008   Islam et al.
(Continued)

FOREIGN PATENT DOCUMENTS

WO     2013162514 A1    10/2013

OTHER PUBLICATIONS

Tagliabue et al., "Rapid-Response Low Infrared Emission Broadband Ultrathin Plasmonic Light Absorber", Scientific Reports 4, Retrieved from Internet—http://www.nature.com/articles/srep07181, 2014, 18 Pages.

*Primary Examiner* — Tarifur R Chowdhury
*Assistant Examiner* — Jonathon Cook
(74) *Attorney, Agent, or Firm* — Rathe Lindenbaum LLP (57) ABSTRACT

A surface enhanced luminescence (SEL) sensor may include a substrate and nano fingers projecting from the substrate. The nano fingers may include a nano finger extending along an axis. The nano finger may include a plasmonically active cap and a pillar supporting the plasmonically active cap. The pillar may have an asymmetric material composition with respect to the axis.

15 Claims, 5 Drawing Sheets

(56) References Cited

U.S. PATENT DOCUMENTS

| | | |
|---|---|---|
| 7,940,387 B2 | 5/2011 | Dluhy et al. |
| 8,372,470 B2 | 2/2013 | Hart et al. |
| 8,462,333 B2 | 6/2013 | Wu et al. |
| 8,605,281 B2 | 12/2013 | Li |
| 8,848,183 B2 | 9/2014 | Yi et al. |
| 9,097,616 B2 | 8/2015 | Wang et al. |
| 2012/0092660 A1* | 4/2012 | Wu ...................... G01N 21/658 |
| | | 356/301 |
| 2015/0065390 A1 | 3/2015 | Bratkovski et al. |
| 2015/0355093 A1* | 12/2015 | Zhou .................. G01N 21/6428 |
| | | 436/501 |

* cited by examiner

NANO FINGERS WITH ASYMMETRIC MATERIAL COMPOSITION

BACKGROUND

Surface enhanced luminescence (SEL) is sometimes used for analyzing the structure of analytes such as inorganic materials and complex organic molecules. SEL sometimes utilizes nanometer dimensioned posts to enhance sensing of analyte. SEL focuses electromagnetic radiation or light onto the analyte, wherein the interaction between the light and the analyte is detected for analysis.

DETAILED DESCRIPTION OF EXAMPLES

Surface enhanced luminescence (SEL), such as surface enhanced Ramen spectroscopy (SERS), may use nanometer dimensioned posts, referred to as nano fingers, to enhance sensitivity. The nano fingers may be closed towards one another to capture analyte between tips of the nano fingers. Evaporation is sometimes used to close the nano fingers towards one another using capillary forces.

Disclosed herein are example SEL sensors or SEL sensor stages and example methods that enhance directional control over the closure of the nano fingers towards one another. As will be described hereafter, the example SEL sensors, SEL sensor stages and methods utilize nano fingers that extend along an axis, wherein each nano finger has a pillar having an asymmetric material composition with respect to the respective axis. In some implementations, the asymmetric material composition enhances control over the direction in which the nano fingers bend during closure. As a result, the nano fingers may be more likely to bend towards one another in a controlled fashion for enhanced sensitivity. In some implementations, the SEL sensor stages may comprise an array of nano fingers, wherein different portions or regions of the array exhibit different bending or closing behavior.

Disclosed herein is an example surface enhanced luminescence (SEL) sensor that comprises a substrate and nano fingers projecting from the substrate. The nano fingers may comprise a nano finger extending along an axis. The nano fingers may include a nano finger extending along an axis. The nano finger may include a plasmonically active cap and a pillar supporting the plasmonically active cap. The pillar may have an asymmetric material composition with respect to the axis.

Disclosed herein is an example method for forming an SEL sensor or sensor stage. The method may include providing nano fingers extending from a substrate along respective axes. The method may further include modifying the nano fingers to provide each of the nano fingers with an asymmetric material composition with respect to their respective axes.

Disclosed herein is an example method for employing an SEL sensor or sensors stage to analyze an analyte. The method may comprise exposing nano fingers to an analyte, wherein each of the nano fingers extend along and axis and have an asymmetric material composition with respect to the axis. The method may further comprise applying a stimulus, such as heat, to the nano fingers to actuate bending of tips of the nano fingers towards one another to capture the analyte between the tips.

Figure 1:
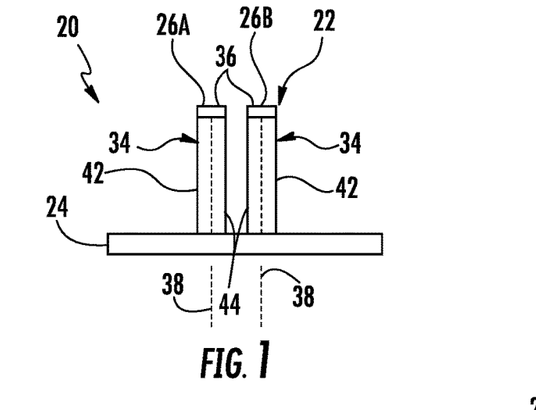
FIG. 1 is a side view of a portion of an example SEL sensor stage.
Figure 2:
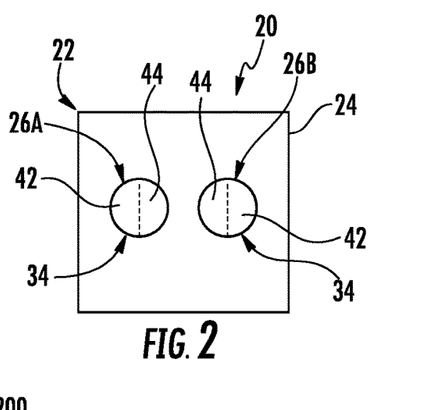
FIG. 2 is a top view of the example SEL sensor stage of FIG. 1.

FIGS. 1 and 2 illustrate portions of an example SEL sensor 20. Sensor 20 comprises a stage 22 upon which analyte is deposited and retained during sensing through the application of a stimulus, such as light, to the analyte upon the stage 22. Stage 22 comprises substrate 24 and nano fingers 26A, 26B (collectively referred to as nano fingers 26). Substrate 24 comprises a base or foundation for supporting nano fingers 26. In one implementation, substrate 24 comprises a layer of silicon, courts, glass or a polymeric film such as polyethylene teraphalate (PET). In some implementations, substrate 24 may additionally comprise and interlayer the dielectric material between the silicon substrate and nano fingers 26. Such an interlayer dielectric may form from a material such as an oxide such as Tetraethyl orthosilicate TEOS), a passivation layer of SiC, silicon nitride, and the like. In other implementations, other interlayer dielectric materials may be utilized. In still other implementations, substrate 24 may be formed from other materials such as quartz, ceramics, polymers and other materials.

Nano fingers 26 comprise elongated flexible columnar supports such as needles, fingers, particles or wires. In one implementation, such nano fingers 26 have an aspect ratio of and at least 10:1 (a height of at least 10 times the thickness or diameter). In one implementation, such nano fingers 26 have a thickness or diameter between 50 nm and 100 nm, while, at the same time, having a height of at least 500 nm and, in one implementation, at least 700 nm. In some implementations, the nano fingers 26 are movable and are self-actuating, wherein such columnar structures bend or flex towards one another in response to micro-capillary forces or van der Waals forces so as to self-organize, wherein such bending facilitates close spacing between the structures for greater scattered radiation intensity.

Each of the nano fingers may comprise a pillar 34 supporting a plasmonically active tip or cap 36. In one implementation, each pillar 34 comprises an elongate column formed from a polymer material. The polymer material facilitates the use of molding, imprinting or other fabrication techniques to form pillars 34. The polymer material further facilitates bending and flexing of pillars 34 and subsequently closing during use of sensor 20. Examples of polymer materials from which each pillar 34 may be formed include, but are not limited to, photo resist, PDMS, or a flexible material selected from the group, which includes both dielectric and non-dielectric materials, consisting of a highly cross-linked UV-curable or thermal-curable polymer, a highly cross-linked UV-curable or thermal-curable plastic, a polysiloxane compound, silicon, silicon dioxide, spin-on glass, a solgel material, silicon nitride, diamond, diamond-like carbon, aluminum oxide, sapphire, zinc oxide, and titanium dioxide.

Cap 36 comprises a plasmonically active structure formed on top of pillar 34 in direct contact with pillar 34. A plasmonically active structure material is a material that converts radiation, such as light or photons, into plasmons, a density wave in an electron gas. In one implementation, cap 36 comprises a metal material that enhances the intensity of electromagnetic radiation emitted as a result of the reaction of the analyte and the light impinging the analyte upon nano fingers 26. In one implementation, cap 36 comprises silver, gold, copper, platinum, aluminum, or combinations of these metals in the form of alloys or multilayer systems. In some implementations, cap 36 may be formed from a metallic oxide such as a tungsten oxide (WOx) or a titanium oxide (TiOx). In another implementation, cap 36 may comprise other metallic materials that provide such intensity enhancement.

As indicated by broken lines, each of pillars 34 has an asymmetric material composition with respect to the axis 38 along which each of pillars 34 extends. In other words, the material composition of a pillar 34, including a single material or combinations of different layers or materials, on a first side of axis 38 has a different composition as compared to the material composition of the same pillar 34 on the second side of axis 38. For example, the pillar 34 of nano finger 26A may comprise a first material or collections of materials 42 on a first side of its axis 38 and a second, different material or different collections of materials 44 on a second side of its axis 38. Likewise, the pillar 34 of nano finger 26B may comprise a first material or collections of materials 42 on a first side of its axis 38 and a second, different material or different collections of materials 44 on a second side of its axis 38.

In one implementation, the differences in the material compositions of the different portions of each of pillars 34 provide each of pillars 34 with a tendency to bend or collapse in one direction versus another. For example, the asymmetric material composition of pillars 34 may be such that pillars 34 and nano fingers 26A and 26B have a tendency to bend towards one another to close caps 36 towards one another. In one implementation, such closure and biased bending of nano fingers 26 is activated through the application of a stimulus. In one implementation, the different material compositions of each pillar 34 with respect to its axis 38 result in each of pillars 34 have an asymmetric response to the same stimulus. In some implementations, the more highly controlled nature of the bending or collapse of the nano fingers using a stimulus may facilitate a more dense arrangement or layout of nano fingers.

In one implementation, each pillar 36 has an asymmetric material composition, wherein the different material compositions have different coefficient of thermal expansions. The overall composition of materials on a first side of axis 38 may have a first coefficient of thermal expansion while the overall composition of materials on a second side of axis 38 may have a second coefficient of thermal expansion different than the first coefficient of thermal expansion. In one implementation, those portions or sides of the adjacent or consecutive nano fingers 26 that face one another or that are closest to one another have material compositions that have a lower coefficient of thermal expansion as compared to those portions or sides of the adjacent or consecutive nano fingers that face away from one another or that are farthest away from one another. As a result, upon the application of heat stimulus, the adjacent or consecutive nano fingers are more likely to bend towards one another rather than away from one another. By selectively providing different portions of each of pillars 34 with an appropriate material composition having an appropriate coefficient of thermal expansion, the direction in which each pillar 34 will bend in response to a stimulus, such as heat, may be more reliably controlled.

Although each of the pillars 34 of nano fingers 26 shown in FIG. 1 are illustrated as having different material compositions 42, 44 that are equally bifurcated along the respective axes 38, in other implementations, the proportionality between material compositions 42 and 44 may be unequal and not necessarily split along axis 38. For example, portion 42 of each of pillars 34 may comprise a very thin or small portion of each of pillars 34 as compared to portion 44. In other implementations, composition 42 of each of pillars 34 may comprise a very thick or large portion of each of pillars 34 as compared to portion 44. Either composition 42 or composition 44 may extend across axis 38 where the other of compositions 42 and 44 do not extend across axis 38. The relative proportionality of compositions 42 and 44 as well as the relative extent of such compositions 42, 44 may vary depending upon the material chosen, the stimulus to be applied and the desired degree of bending of nano fingers 26.

Figure 3:
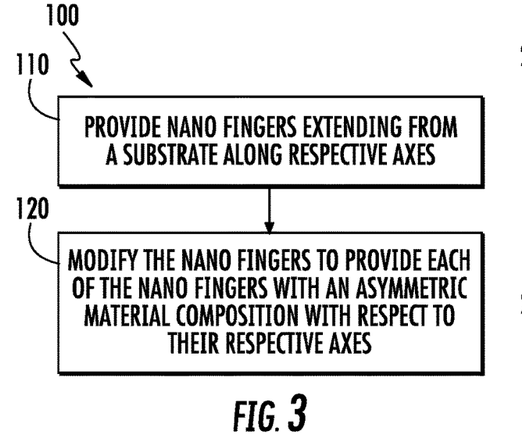
FIG. 3 is a flow diagram of an example method for forming an example SEL sensor stage.

FIG. 3 is a flow diagram illustrating an example method 100 for forming and SEL sensor or sensor stage. Method 100 facilitates the formation of an SEL sensor stage that provides enhanced control over the bending of nano fingers in response to an applied stimulus. Although method 100 is described with respect to sensor stage 22 described above, it should be appreciated that method 100 may be utilized to form any of the SEL stages or sensors described hereafter as well as other SEL stages or sensors.

As indicated by block 110, nano fingers 26 are provided. The nano fingers 26 extend from substrate 24 along respective axes 38. As indicated by block 120, the nano fingers 26 are modified to provide each of the nano fingers 26 with an asymmetric material composition with respect to their respective axes 38. In one implementation, the pillars 34 of each of nano fingers 26 may be molded or otherwise formed with different material compositions along the respective axes 38.

In another implementation, a supplemental film or coating of a material different than that of the initial pillars 34 may be selectively applied or coated upon selected portions of each of pillars 34 to provide each of pillars 34 with an asymmetric material composition. For example, sides of adjacent or consecutive pillars 34 that face away from one another or that are most distant from one another may be coated with a different material or different materials to provide each of pillars 34 with an asymmetric material composition. In one implementation, those faces or sides of each pillar 34 that face away from one another may be coated with a material having a lower coefficient of thermal expansion such that upon the application of a heat stimulus, the adjacent or consecutive pillars 34 of the adjacent or consecutive nano fingers 26 are more likely to bend towards one another upon the application of heat stimulus.

In another implementation, each of the initially provided pillars 34 of nano fingers 26 comprises a first material. The pillars 34 are modified by modifying the existing first material along a portion of each side of each of the pillars 34 so as to form a second material different than the original first material. For example, in one implementation, selected portions of the initially provided pillars may be chemically altered, to alter response to a stimulus. In one implementation, selected portions of the initially provided pillars of a first material may be chemically altered so as to convert the first material to a second material having a higher coefficient of thermal expansion or a lower coefficient of thermal expansion as compared to those remaining portions of the pillars that are left with the first unaltered material.

In one implementation, the pillars 34 initially have a homogeneous composition of material such as polymethyl methacrylate with weight average molecular weight of 300 000 Da, wherein selected portion of the pillars is treated by UV causing chain scission and creating a polymethyl methacralyate with molecular weight of 30 000 Da and thereby increasing the linear thermal expansion coefficient of that area of the pillar. Subsequent application of heat stimuli may cause the pillar to preferentially collapse in a direction away from those regions that have been treated and that have undergone chain scission.

In another implementation, rather than treating selected portions of the pillars 34 to break the polymeric chains and increase the coefficient of thermal expansion in selected regions of the pillars 34 to preferentially control the direction of bending or collapse upon the subsequent application of stimuli, selected portion of pillars are treated to shorten such chains or links in selected regions or portions of the polymeric material of each of pillars 34. For example, in one implementation, material inside the nano finger may contain a photo initiator agent. Application of laser light, or light of any wavelength that activates the photo initator (thermal or UV) to selected portions or regions of the pillar crosslinks such regions or portions of the polymer, decreasing the coefficient of thermal expansion for such regions or portions.

The application of light causes a photo initiated chemical reaction that changes the relative light adsorption of such portions of the pillar relative to other portions of the other pillar. During subsequent application of light, those portions of the pillar that undergone the photo initiated chemical reaction heat up at a faster rate as compared to other portions of pillar that have not undergone the photo initiated chemical reaction. Because those portions of the pillar that of undergone the photo initiated chemical reaction heat up faster, they also reach the glass transition temperature melting point of the polymer faster, causing the pillar to collapse or bend preferentially in a direction towards those regions that have undergone the photo initiated chemical reaction.

Figure 4:
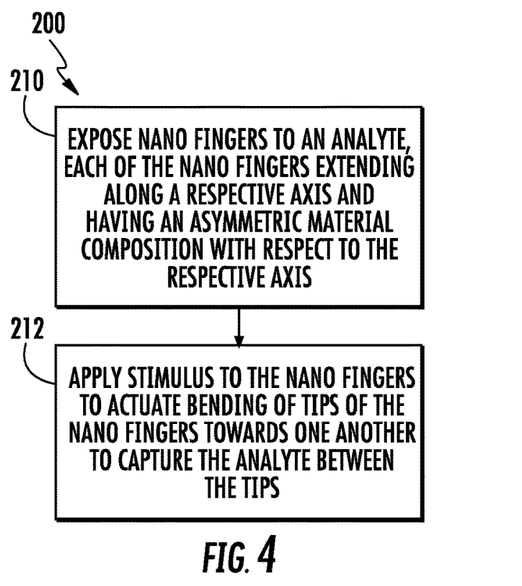
FIG. 4 is a flow diagram of an example method for using an example SEL sensor stage as part of a process to analyze an analyte

FIG. 4 is a flow diagram of an example method 200 for using an SEL sensor or SEL stage as part of analyzing an analyte. Method 200 may provide greater control over the direction of bending of nano fingers to enhance analyte detection or analysis. Although method 200 is described as being carried out using sensor stage 22 as shown in FIGS. 5 and 6, it should be appreciated that method 200 may be carried out with any of the sensor stages described hereafter or with other sensor stages.

As indicated by block 210, nano fingers 26 are exposed to an analyte 52. The analyte 52 may be provided in a liquid solution which covers nano fingers 26. In some implementations, the analyte 52 may be carried or be provided as part of a gas. As described above, each of nano fingers 26 extends along respective axes 38 and has an asymmetric material composition with respect to the respective axes 38.

As indicated by block 212, the stimulus is applied to the nano fingers to actuate bending of the tips or caps 36 towards one another to capture the analyte 52 between the tips or caps 36. In one implementation, the stimulus is in the form of heat applied by either a heat source 54 that overlies nano fingers 26 or a heat source 56 that underlies nano fingers 26. For example, in one implementation, heat source 56 may comprise an electrical resistor or multiple electric resistors embedded in or formed adjacent to substrate 24, wherein the application of electrical current through the electric resistors generates heat.

Figure 5:
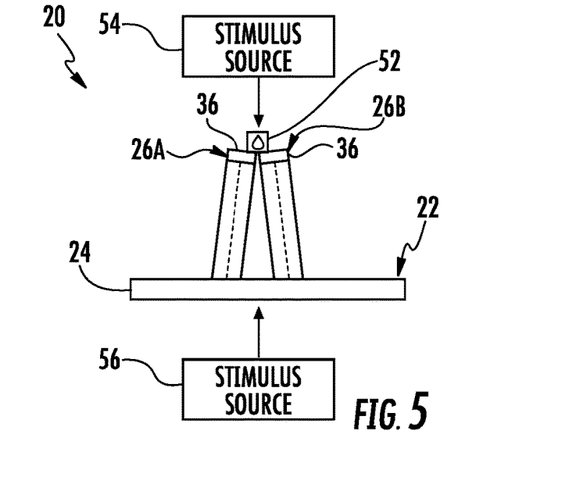
FIG. 5 is a side view of the example SEL sensor stage of FIG. 1 during the application of stimulus.
Figure 6:
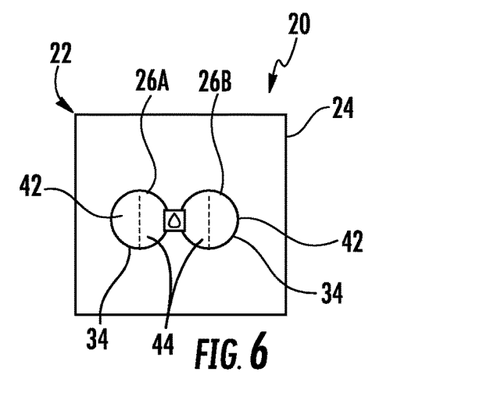
FIG. 6 is a top view of the example SEL sensor stage of FIG. 5 during the application of the stimulus.

As further shown by FIGS. 5 and 6, the asymmetric material composition of nano fingers 26 results in asymmetric bending or deformation of nano fingers 26 in response to the applied stimulus. The asymmetric material composition of nano fingers 26 results in nano fingers 26 preferentially bending in directions towards one another. For example, in implementations where the stimulus source is comprise a heater 54 and/or a heater 56, the different material compositions having different coefficient of thermal expansion may facilitate preferential bending in directions such that nano fingers 26 close towards one another upon the application of heat.

In some implementations where the analyte is provided as part of a liquid, such bending is further facilitated by capillary forces as the liquid evaporates. In such an implementation, the application of heat may facilitate closing or bending of nano fingers 26 in two different fashions: bending brought about the different coefficient of thermal expansion of the asymmetric material compositions and bending brought about by evaporation of the liquid and capillary forces or van der Waals forces. In other implementations where the analyte is provided as part of a gas, the asymmetric material composition of nano fingers 26 and the applied stimulus may facilitate the bending of nano fingers 26 and the capture of analyte 22 at the caps 36 with less or no reliance upon capillary forces.

Figure 7:
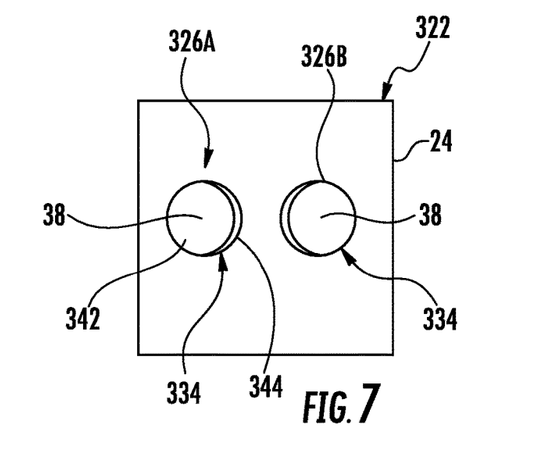
FIG. 7 is a top view of another example SEL sensor stage.

FIG. 7 is a top view of another example SEL sensor stage 322. Stage 322 is similar to stage 22 described above except that stage 322 comprises nano fingers 326A, 326B (collectively referred to as nano fingers 326). Like stage 22, sensor stage 322 facilitates enhanced control over the bending or closing direction of its nano fingers 326. Those components of sensor stage 322 which correspond to components of sensor stage 22 are numbered similarly.

Nano fingers 326 rise above and are upstanding with respect to substrate 24. Each of nano fingers 326 comprises a plasmonically active tip or cap 36 (shown in FIG. 1) and an underlying supporting pillar 334. Each pillar 334 has an asymmetric material composition with respect to its central axis 38. In the example illustrated, each pillar 334 is provided with an asymmetric material composition by asymmetrically or non-uniformly coating a selected portion or portions pillar 334 with a material different than that of the remainder of pillar 334. In the example illustrated, each pillar 334 has a central portion 342 and a film or coating 344. Central portion 342 extends beyond one side of axis 38 so as to form a side face of the pillar 334 facing away from the adjacent pillar 334 of the adjacent nano finger 326. Coating 344 coats that side of pillar 334 that faces and is closest to the adjacent pillar 334 of the adjacent nano finger 326.

In one implementation, coating 344 comprises a material having properties relative to the remainder of pillar 334 that increases the tendency of the associated pillar 334 to bend in a direction towards the side of pillar 334 having coating 344 in response to a stimulus. In the example illustrated, coating 344 facilitates bending of each of nano fingers 326 in directions towards one another response to the application of a stimulus. In one implementation, coating 344 may comprise a material having a lower coefficient of thermal expansion, such that upon the application of a heat stimulus, nano fingers 326 preferentially bend or close in directions towards one another.

Figure 8:
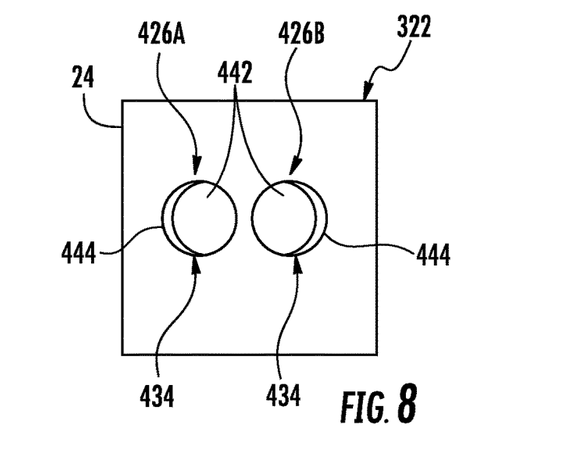
FIG. 8 is a top view of another example SEL sensor stage.

FIG. 8 is a top view of another example SEL sensor stage 422. Stage 422 is similar to stage 322 described above except that stage 422 comprises nano fingers 426A, 426B (collectively referred to as nano fingers 426). Like stages 22 and 322, sensor stage 422 facilitates enhanced control over the bending or closing direction of its nano fingers 426. Those components of sensor stage 422 which correspond to components of sensor stages 22 and 322 are numbered similarly.

Nano fingers 426 rise above and are upstanding with respect to substrate 24. Each of nano fingers 426 comprises a plasmonically active tip or cap 36 (shown in FIG. 1) and an underlying supporting pillar 434. Each pillar 434 has an asymmetric material composition with respect to its central axis 38. In the example illustrated, each pillar 434 is provided with an asymmetric material composition by asymmetrically or non-uniformly coating a selected portion or portions pillar 434 with a material different than that of the remainder of pillar 434. In the example illustrated, each pillar 434 has a central portion 442 and a film or coating 444. Central portion 442 extends beyond one side of axis 38 so as to form a side face of the pillar 334 facing the adjacent pillar 434 of the adjacent nano finger 426. Coating 444 coats that side of pillar 434 that faces away from and is farthest from the adjacent pillar 434 of the adjacent nano finger 426.

In one implementation, coating 444 comprises a material that decreases the tendency of the associated pillar 434 to bend in a direction towards the side of pillar 434 having coating 444. In other words, coating 444 resists bending of each of nano fingers 426 in directions away from one another in response to the application of a stimulus. In one implementation, coating 444 may comprise a material having a greater coefficient of thermal expansion, such that upon the application of a heat stimulus, nano fingers 426 preferentially bend or close in directions towards one another.

Figure 9:
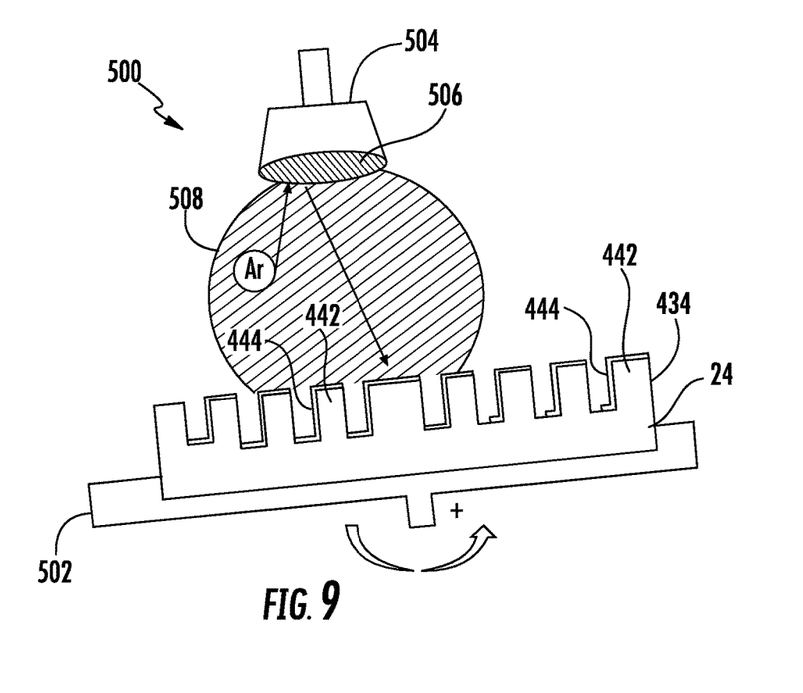
FIG. 9 is a side view of an example deposition device for forming an example SEL sensor stage.

FIG. 9 schematically illustrates one example deposition device 500 for selectively coating portions or sides of the pillars 34 so as to provide such pillars with an asymmetric material composition with respect to their central axes. In the example illustrated in FIG. 9, the upstanding pillars 34 are selectively coated using physical vapor deposition (PVD) or sputtering. To selectively coat selected portions of such pillars, substrate 24 and the upstanding pillars 34, formed from a material such as a polymer, are supported on an angled fixture 502. Examples of polymer materials from which each pillar 34 may be formed include, but are not limited to, photo resist, PDMS, or a flexible material selected from the group, which includes both dielectric and non-dielectric materials, consisting of a highly cross-linked UV-curable or thermal-curable polymer, a highly cross-linked UV-curable or thermal-curable plastic, a polysiloxane compound, silicon, silicon dioxide, spin-on glass, a solgel material, silicon nitride, diamond, diamond-like carbon, aluminum oxide, sapphire, zinc oxide, and titanium dioxide.

The angled fixture 502 serves as an anode positioned opposite to a cathode 504 which supports and oxide target 506. Substrate 24 and the upstanding pillar 34 are subjected to argon gas 508, wherein, due to the angle of fixture 502 and the angle of substrate 24 with the upstanding pillars 34, and oxide film or coating, such as coating 444 described above, is deposited through physical vapor deposition, sputtering, on selected portions or sides of each of pillars 34. In one implementation, the coating selectively applied or coated upon particular portions of pillars 34 may comprise a material such as tantalum oxide, titanium oxide, Halfninum oxide, titanium nitride, zirconium nitride, chromium nitride, and titanium aluminum nitride. Thereafter, caps 36 may be formed or deposited upon the tops of such asymmetrically coated pillars 34 to form an SEL stage, such as stage 322 described above.

Figure 10:
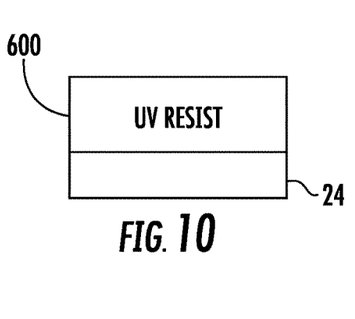
FIGS. 10-14 are side views illustrating an example method for forming an example SEL sensor stage.
Figure 11:
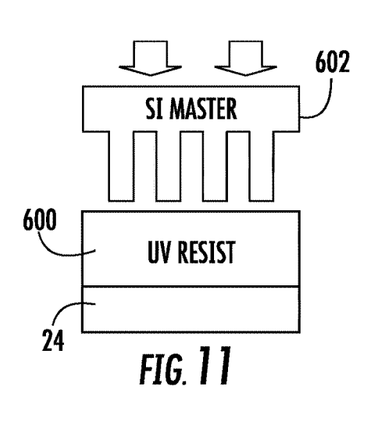
Figure 12:
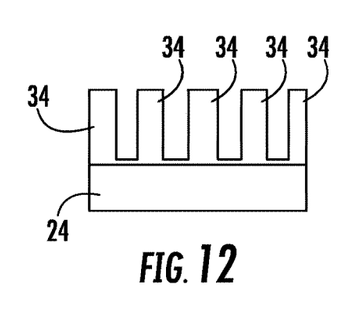

FIGS. 10-14 illustrate an example method for forming an example SEL stage 622 (shown in FIG. 14) having nano fingers that includes pillars having asymmetric material compositions. As illustrated by FIG. 10, a layer of material forming substrate 24 is initially coated with a layer 600 of a second moldable or patternable material, such as a UV resistant material. As illustrated by FIG. 11, the layer 600 of the UV resistant material is imprinted with a master 602, such as a silicon master. While being imprinted with the master, layer 600 is exposed to ultraviolet light to harden or cure the now patterned layer 600. As shown by FIG. 12, master 602 is subsequently destroyed or withdrawn, leaving substrate 24 and partially completed pillars 34.

Figure 13:
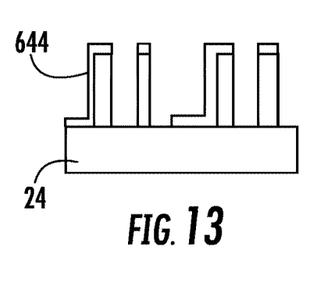
Figure 14:
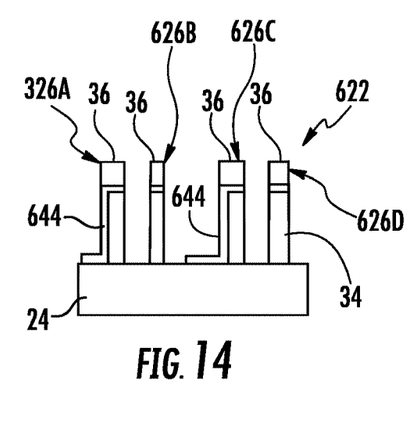

FIG. 13 illustrates the directional coating or sputtering of coating 644 on the partially completed pillars 34 using physical vapor deposition, such as with the deposition device 500 shown in FIG. 9. As shown by FIG. 13, one side of each of the partially completed pillars 34 is coated with coating 644. In one implementation, the coating 644 may comprise a material that is resistant to collapse or bending in spite of the application of a stimulus, such as heat. In one implementation, coating 644 may comprise a material such as tantalum oxide, titanium oxide, Halfninum oxide, titanium nitride, zirconium nitride, chromium nitride, and titanium aluminum nitride. The opposite side of each of pillars 34 is not coated due to the angle of fixture 502 and other pillars blocking such deposition. Open areas at the base of each of pillars 34, along the surface of substrate 24, may also be coated, forming an anchor to substrate 24 for the coated pillar to resist collapse or closure. As shown by FIG. 14, caps 36 (described above) are subsequently formed on top of each of the pillars 34 have an asymmetric material composition to complete the individual nano fingers 626.

Figure 15:
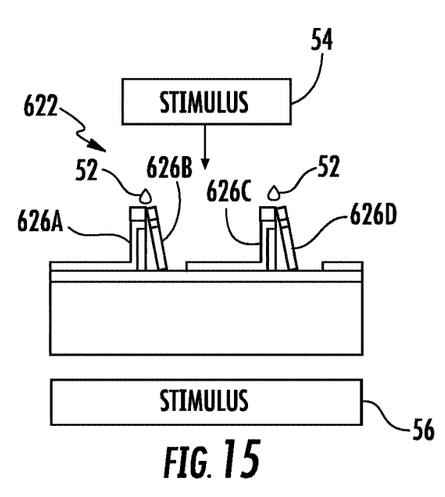
FIG. 15 is a side view of an example SEL sensor stage during the application of a stimulus.

FIG. 15 illustrates the example SEL stage 622 during the application of a stimulus by stimulus applicators 54 and/or 56 to achieve an asymmetric closing or collapse of nano fingers 626. Nano fingers 626 are exposed analyte 52 during which the stimulus from source 54 and/or source 56 is applied. In one implementation, the stimulus may comprise heat.

The applied stimulus actuates the applied substantially uncoated nano fingers 626 to a collapsed or closed state with respect to coated nano fingers 626 which resists bending or collapse in response to the stimulus. As further shown by FIG. 15, the nano fingers which are coated, nano fingers 626A and nano fingers 626C, resist bending or collapse during the application of the stimulus due to coating 644. At the same time, the nano fingers, nano fingers 626B and 626D, which are not coated or which have much less coating are more readily collapsed towards the relatively stationary nano fingers.

For example, heat stimulus applied by stimulus sources 54 and/or 56 may heat such nano fingers to a temperature above the glass transition temperature such that the pillars 34 of nano fingers 626B and nano fingers 626D soften and collapse. Such nano fingers collapse towards the coated nano fingers 626A and 626C due to van der Waals forces. The coatings 644 on nano fingers 626A and 626C may have a glass transition temperature which is greater than the material of those pillars without the coating and greater than the temperature to which such nano fingers are being heated by stimulus sources 54 and/or 56. In another implementation, the coating 644 may have a lower coefficient of thermal expansion as compared to the remainder of each of the pillars 34. As a result, the coated pillars 34 of nano fingers 626A and 626C are upheld by coating 644, resisting such collapse or bending.

Figure 16:
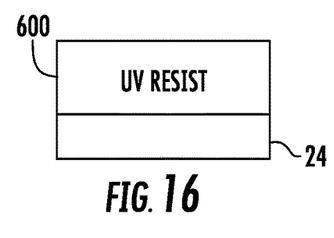
FIGS. 16-20 are side views illustrating an example method for forming an example SEL sensor stage.
Figure 17:
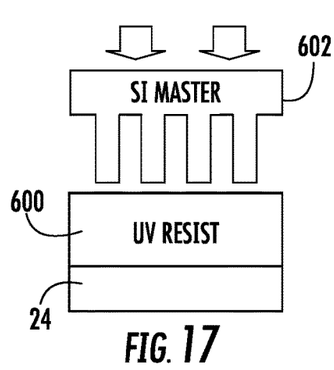
Figure 18:
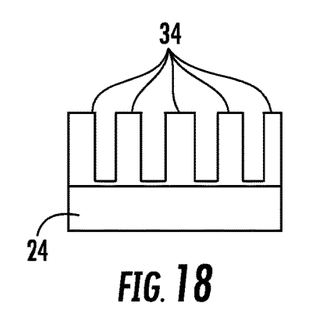

FIGS. 16-20 illustrate another example method for forming an example SEL stage 722 (shown in FIG. 20) having nano fingers that includes pillars having asymmetric material compositions. FIGS. 16-18 illustrate the same processes described above with respect to FIGS. 10-12.

Figure 19:
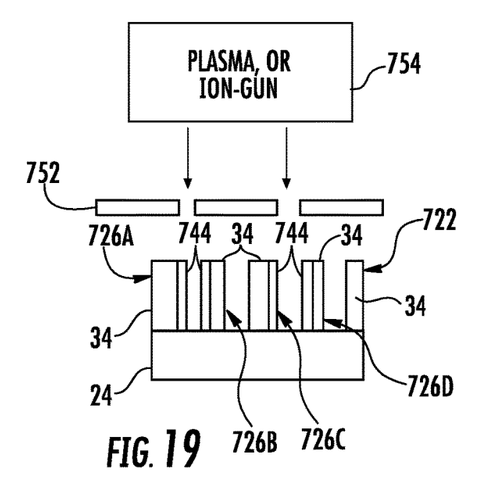

FIG. 19 illustrates the selective deposition of coatings 744 on selected portions or sides of pillars 34 through the use of a shadow mask 752 and the use of a deposition device such as a plasma or ion gun 754 (schematically illustrated). As shown by FIG. 19, through plasma ashing/bombarding through shadow mask 752, selected surfaces of pillars 34 are coated with coating 744. In the example illustrated, mutually facing surfaces of adjacent or consecutive pillars 34 are coated with coating 744.

Figure 20:
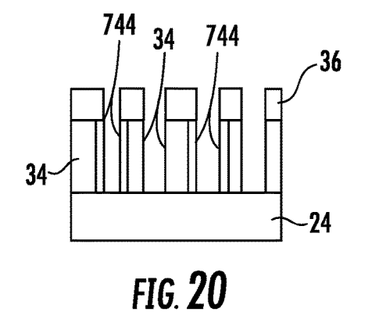

In the example illustrated, coating 744 comprises a material or materials that shrink or change shape at a rate greater than or to a greater extent than the material or materials of pillars 34 in response to an applied stimulus. As a result, upon stage 722 receiving the stimulus, the collapse or bending of the nano fingers 726 is in a controlled direction, wherein adjacent nano fingers collapse towards one another. In one implementation, coating 744 comprise a material that shrinks or change the shape at a greater rate or to a greater extent than the material or materials of pillars 34 in response to an applied stimulus of heat. As shown by FIG. 20, nano fingers 76 are completed with the deposition or addition of caps 36 described above.

Figure 21:
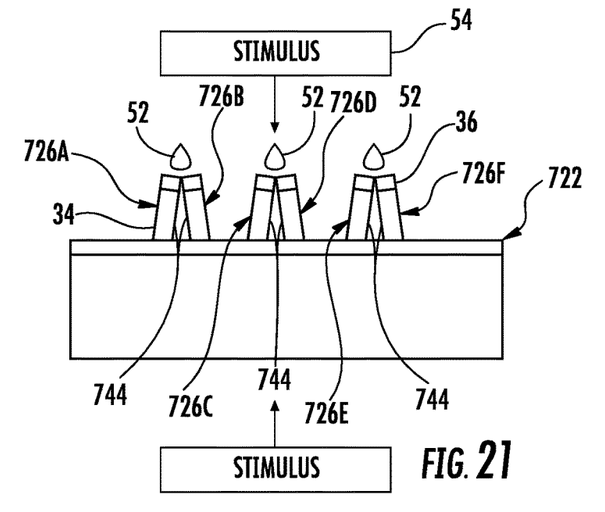
FIG. 21 is a side view of an example SEL sensor stage during the application of a stimulus.

FIG. 21 illustrates the example SEL stage 722 during the application of a stimulus by stimulus applicators 54 and/or 56 to achieve an directionally controlled closing or collapse of nano fingers 726. Nano fingers 626 are exposed analyte 52 during which the stimulus from source 54 and/or source 56 is applied. In one implementation, the stimulus may comprise heat.

In one implementation, the material of coating 744 on the mutually facing side or surface of the pillars 34 of nano fingers 726 expands at a rate different than that of the material of pillars 34 in response to the application of heat. In the example illustrated, coating 744 expand at a slower rate as compared to pillars 34 in response to the application of heat by stimulus source 54 and/or stimulus source 56. As a result, nano fingers 726 tend to bend or collapse in directions towards the side of the pillar having coating 744. This results in nano fingers 726A and 726B bending or collapsing towards one another, nano fingers 726C and 726D bending or collapsing towards one another and nano fingers 726E and 726F bending or collapsing towards one another. Because the direction of collapse or bending is more controllable with coating 744, in some implementations, the density of nano fingers 726 on substrate 722 may be increased.

Figure 22:
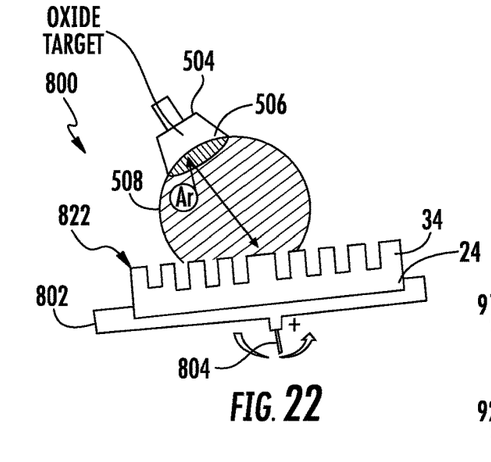
FIG. 22 is a side view of an example deposition device for forming an example SEL sensor stage.

FIG. 22 illustrates an example deposition device 800 for providing nano fingers with an asymmetric material composition. Deposition device 800 is similar to deposition device 500 described above except that device 800 comprises a fixture 802 that is angled and that is rotatable about axis 804. Those remaining components of deposition device 800 which correspond to components of deposition device 500 are numbered similarly. Device 800 operates in a fashion similar to that of device 500 except that, in some implementations, fixture 802 is rotatably driven during the coating of pillars 34.

Figure 23:
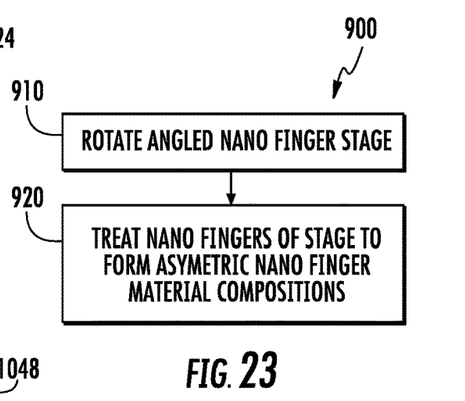
FIG. 23 is a flow diagram of an example method for forming an example SEL sensor stage.
Figure 24:
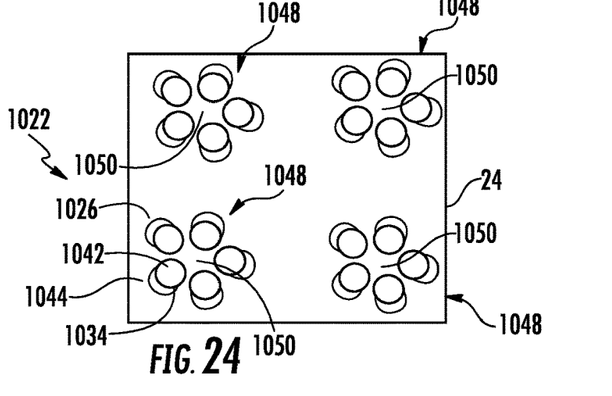
FIG. 24 is a top view of another example SEL sensor stage.

FIG. 23 is a flow diagram of an example method 900 for forming an SEL stage, such as the example SEL stage illustrated in FIG. 24. Method 900 facilitates the coating of pillars 34 of nano fingers, arranged in clusters, such that the coatings asymmetrically reside on faces of the pillars 34 encircling a center point of each cluster of pillars 34 and such that the resulting nano fingers are directionally biased to collapse or bend towards the center point upon the application of a stimulus. Although method 900 is described respect to the use of deposition device 800, it should be appreciated that method 900 may be carried out with other deposition devices that may carry out the described blocks.

As indicated by block 910, the partially completed SEL sensor stage 822, comprising substrate 24 and pillars 34, is angled and is rotated. Using device 800, the partially completed stage 1022 is mounted or secured upon fixture 802 which is supported at an angle and is rotatably driven about axis 804.

As indicated by block 920, the partially completed nano fingers of the partially completed stage 822 are treated, while the partially completed stage 822 is angled and is rotated, to form asymmetric nano finger compositions. In one implementation, the pillars 34, extending from substrate 24, are each asymmetrically coated by coating the initial pillars 34 while the initial pillars 34 are angled and being rotated. Thereafter, caps 36 (shown and described above) are deposited on each of pillars 34 to form the SEL sensor stage, such as the example SEL sensor stage 1022 illustrated in FIG. 24.

In implementations where such coating is achieved using deposition device 800, such coatings are asymmetrically sputtered onto the initial pillars 34, such as through the use of physical vapor deposition. In one implementation, initial pillars 34 are formed from a polymer or multiple polymers. Examples of polymer materials from which each initial pillar 34 may be formed include, but are not limited to, photo resist, PDMS, or a flexible material selected from the group, which includes both dielectric and non-dielectric materials, consisting of a highly cross-linked UV-curable or thermal-curable polymer, a highly cross-linked UV-curable or thermal-curable plastic, a polysiloxane compound, silicon, silicon dioxide, spin-on glass, a solgel material, silicon nitride, diamond, diamond-like carbon, aluminum oxide, sapphire, zinc oxide, and titanium dioxide.

As described above with respect to the use of device 500, angled fixture 502 serves as an anode positioned opposite to a cathode 504 which supports and oxide target 506. Substrate 24 and the upstanding pillars 34 are subjected to argon gas 508, wherein, due to the angle of fixture 502 and the angle of substrate 24 with the upstanding initial pillars 34, and oxide film or coating, such as coating 444 described above, is deposited through physical vapor deposition, sputtering, on selected portions or sides of each of the initial pillars 34. In one implementation, the coating selectively applied or coated upon particular portions of pillars 34 may comprise a material such as tantalum oxide, titanium oxide, Halfninum oxide, titanium nitride, zirconium nitride, chromium nitride, and titanium aluminum nitride.

Due to the rotation of substrate 24 and the upstanding initial pillars 34 during coating, the outer surfaces of clusters of nano fingers become coded while the inner surfaces of the nano fingers of the nano finger clusters remain uncoated. The close proximity of the nano fingers of the clusters results in the inner surfaces of such clusters being blocked to provide the nano fingers with pillars having asymmetric material compositions. Thereafter, caps 36 may be formed or deposited upon the tops of such asymmetrically coated pillars 34 to form an SEL stage, such as stage 1022 described below.

FIG. 24 is a top view of an example SEL sensor stage 1022. In some implementations, sensor stage 1022 may be formed using method 900 and/or using deposition device 800. Stage 1022 comprises substrate 24 and nano fingers 1026 upstanding and extending from substrate 24. Each of nano fingers 1026 comprises a pillar 1034 having an asymmetric material composition and a cap 36 supported on top of the pillar 1034 (not shown in FIG. 24, but illustrated in FIG. 21.

As further shown by FIG. 24, nano fingers 1026 are arranged in clusters positioned about a center point. In the example illustrated, nano fingers 1026 are arranged in pentamer 1048, an arrangement of five nano fingers centered about or positioned about a center 1050. The asymmetric material composition of each of nano fingers causes the nano fingers of each pentamer to bend or collapse towards the center point 1050.

Each pillar 1034 comprises a central portion 1042 and a peripheral coating 1044. Central portion 1042 and coating 1044 respond differently to an applied stimulus such that each pillar 1034 has a tendency to bend or collapse in a direction towards the center point 1050. In one implementation, the material forming center portion 1042 has a coefficient of thermal expansion less than that of material forming coating 1044. As a result, in response to the application of a stimulus in the form of heat, each nano finger 1026 bend or collapse in a direction away from the side of the nano finger having coating 1044, towards center point 1050.

In one implementation, central portions 1042 of each of pillars 1034 are formed from a polymer or multiple polymers. Examples of polymer materials from which each pillar 34 may be formed include, but are not limited to, photo resist, PDMS, or a flexible material selected from the group, which includes both dielectric and non-dielectric materials, consisting of a highly cross-linked UV-curable or thermal-curable polymer, a highly cross-linked UV-curable or thermal-curable plastic, a polysiloxane compound, silicon, silicon dioxide, spin-on glass, a solgel material, silicon nitride, diamond, diamond-like carbon, aluminum oxide, sapphire, zinc oxide, and titanium dioxide. In one implementation, coatings 1044 may comprise a material such as Halfninum oxide, titanium nitride, zirconium nitride, chromium nitride, and titanium aluminum nitride.

Although SEL sensor stage 1022 is illustrated as having nano fingers arranged in clusters of five nano fingers to form pentamers 1048, in other implementations, the nano fingers may be arranged in other clusters having other numbers of nano fingers arranged about a center point. For example, in other implementations, nano fingers 1026 may be arranged in clusters having any number of nano fingers 1026 greater than three and centered about a center point.

Figure 25:
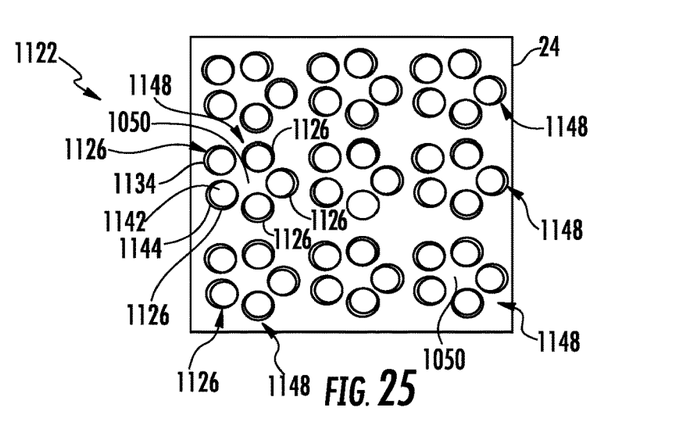
FIG. 25 is a top view of another example SEL sensor stage.

FIG. 25 is a top view of an example SEL sensor stage 1122. Stage 1122 comprises substrate 24 and nano fingers 1126 upstanding and extending from substrate 24. Similar to stage 1022, the nano fingers 1126 of stage 1122 are arranged in clusters. Similar to stage 1022, stage 1122 has clusters of five nano fingers, pentamers 1148, wherein each of the pentamers 1148 is arranged about a center point 1050. In some implementations, sensor stage 1122 may be formed using method 900.

Nano fingers 1126 are similar to nano fingers 1026 except that nano fingers 1126 comprise pillars 1134 in lieu of pillars 1034. Each of nano fingers 1126 comprises a pillar 1134 having an asymmetric material composition and a cap 36 supported on top of the pillar 1134 (not shown in FIG. 25, but illustrated in FIG. 21. Pillars 1134 do not have coatings, but are instead formed by treating the initial existing first material of pillars 1134 to convert portions of the first material to a second different material having different properties and different responses to the to be applied stimulus.

As shown by FIG. 25, selected portions of the initially provided pillars, having a homogenous material composition, may be chemically altered, to alter response to a stimulus. In one implementation, selected portions of the initially provided pillars of a first material may be chemically altered so as to convert the first material to a second material having a higher coefficient of thermal expansion or a lower coefficient of thermal expansion as compared to those remaining portions of the pillars that are left with the first unaltered material.

In the example illustrated, each pillar 1134 comprises a central portion 1142 and a treated portion 1144. Central portion 1142 and treated portion 1144 respond differently to an applied stimulus such that each pillar 1134 has a tendency to bend or collapse in a direction towards the center point 1050. In one implementation, the material forming center portion 1142 has a coefficient of thermal expansion less than that of material forming coating 1144. As a result, in response to the application of a stimulus in the form of heat, each nano finger 1126 bends or collapses in a direction away from the side of the nano finger having treated portion 1144, towards center point 1050.

In one implementation, the pillars 1134 initially have a homogeneous composition of material such as polymethyl methacrylate with weight average molecular weight of 300 000 Da, wherein selected portion of the pillars is treated by UV causing chain scission and creating a polymethyl methacralyate with molecular weight of 30 000 Da and thereby increasing the linear thermal expansion coefficient of treated portion 1144 of the pillar 1134. Subsequent application of heat stimuli may cause the pillar to preferentially collapse in a direction away from those regions 1144 that have been treated and that have undergone chain scission.

In another implementation, rather than treating selected portions of the pillars 1134 to break the polymeric chains and increase the coefficient of thermal expansion in selected regions of the pillars 1134 to preferentially control the direction of bending or collapse upon the subsequent application of stimuli, selected portion of pillars are treated to shorten such chains or links in selected regions or portions of the polymeric material of each of pillars 1134. For example, in one implementation, material inside the nano fingers 1126 may contain a photo initiator agent. Application of laser light, or light of any wavelength that activates the photo initator (thermal or UV) to selected portions or regions 1142 of the pillar crosslinks such regions or portions of the polymer, decreasing the coefficient of thermal expansion for such regions or portions.

The application of light causes a photo initiated chemical reaction that changes the relative light adsorption of such portions 1142 of the pillar 1144 relative to other portions of the other pillar. During subsequent application of light, those portions 1142 of the pillar 1134 that undergone the photo initiated chemical reaction heat up at a faster rate as compared to other portions of pillar that have not undergone the photo initiated chemical reaction. Because those portions 1142 of the pillar 1134 that of undergone the photo initiated chemical reaction heat up faster, they also reach the glass transition temperature melting point of the polymer faster, causing the pillar 1134 to collapse or bend preferentially in a direction towards those regions 1142 that have undergone the photo initiated chemical reaction.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A surface enhanced luminescence (SEL) sensor comprising:
   a substrate;
   nano fingers projecting from the substrate, the nano fingers comprising a nano finger extending along an axis and comprising:
   a plasmonically active cap; and
   a pillar supporting the plasmonically active cap, the pillar having an asymmetric material composition with respect to the axis.

2. The sensor of claim 1, wherein the pillar comprises:
   a central portion of a first material extending along the axis and having a side wall and a top; and
   a coating of a second material asymmetrically covering the sidewall with respect to the axis.

3. The sensor of claim 1, wherein the pillar comprises:
   a central portion extending along the axis formed from a first material; and
   a second portion extending along the axis formed from a second material, the second material comprising an altered composition of the first material.

4. The sensor of claim 1, wherein the pillar comprises:
   a first material extending on a first side of the axis having a first coefficient of thermal expansion; and
   a second material extending on a second side of the axis having a second coefficient of thermal expansion different than the first coefficient of thermal expansion.

5. The sensor of claim 1, wherein the pillar comprises:
   a first material extending on a first side of the axis having a first coefficient of absorption of thermal energy; and
   a second material extending on a second side of the axis having a second coefficient of absorption of thermal energy different than the first coefficient of absorption of thermal energy.

6. The sensor of claim 1, wherein the nano fingers comprise consecutively spaced nano fingers, the consecutive spaced nano fingers comprising the nano finger and a second nano finger extending along a second axis, the second nano finger having asymmetric material composition with respect to the second axis.

7. The sensor of claim 1, wherein the nano fingers comprise consecutively spaced nano fingers, the consecutive spaced nano fingers comprising the nano finger and a second nano finger extending along a second axis, the second nano finger having an asymmetric material composition with respect to the second axis, wherein the nano finger comprises a first material on a first side of the axis proximate the second nano finger and a second material, different than the first material, on a second side of the axis distant the second nano finger and wherein the second nano finger comprises the first material on a first side of the second axis proximate the nano finger and the second material on a second side of the second axis distant the nano finger.

8. The sensor of claim 1, wherein the nano fingers comprise consecutively spaced nano fingers, the consecutive spaced nano fingers comprising the nano finger and a second nano finger extending along a second axis,
   wherein in response to a first stimulus, the nano finger is actuatable to a first bent state greater than a second bent state of the second nano finger in response to the first stimulus, and
   wherein in response to a second stimulus, different than the first stimulus, the nano finger is actuatable to a third bent state less than a fourth bent state of the second nano finger in response to the second stimulus.

9. The sensor of claim 1, wherein the nano fingers comprise consecutively spaced nano fingers, the consecutive spaced nano fingers comprising the nano finger and a second nano finger extending along a second axis, the second nano finger having an asymmetric material composition with respect to the second axis, wherein the nano finger comprises a first material on a first side of the axis having a first coefficient of thermal expansion (COTE) proximate the second nano finger and a second material, having a second COTE less than the first COTE, on a second side of the axis distant the second nano finger and wherein the second nano finger comprises third material having a third COTE on a first side of the second axis proximate the nano finger and a fourth ii material having a fourth COTE less than the third COTE on a second side of the second axis distant the nano finger.

10. The sensor of claim 1, wherein the nano fingers are arranged in a cluster of at least three nano fingers arranged about a center and wherein each of the nano fingers of the cluster has an asymmetric material composition to actuate bending of the nano fingers of the cluster towards the center in response to the cluster of the at least three nano fingers being heated.

11. A method comprising:
   providing nano fingers extending from a substrate along respective axes; and
   modifying the nano fingers to provide each of the nano fingers with an asymmetric material composition with respect to their respective axes.

12. The method of claim 11, wherein the nano fingers initially comprise pillars of a first material and wherein modifying the nano fingers comprises selectively coating a portion of a side of each of the pillars is a second material different than the first material.

13. The method of claim 12 further comprising rotating the substrate and the nano fingers during the selective coating of the portion of the side of each of the pillars with the second material.

14. The method of claim 11, wherein the nano fingers initially comprise pillars of the first material and wherein modifying the nano fingers comprises modifying the first material along a portion of a side of each of the pillars to form a second material different than the first material.

15. A method comprising:
exposing nano fingers to an analyte, each of the nano fingers extending along a respective axis and having an asymmetric material composition with respect to the respective axis; and
apply stimulus to the nano fingers to actuate bending of tips of the nano fingerse towards one another to capture the analyte between the tips.

\* \* \* \* \*